United States Patent
Kamel et al.

(10) Patent No.: US 12,273,040 B2
(45) Date of Patent: Apr. 8, 2025

(54) GENERATING AND SUPPLYING BIAS POWER TO ISOLATED POWER CONVERTERS

(71) Applicant: GM GLOBAL TECHNOLOGY OPERATIONS LLC, Detroit, MI (US)

(72) Inventors: Mohamed Kamel, Rochester, MI (US); Chandra S. Namuduri, Troy, MI (US); Muhammad Hussain Alvi, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 128 days.

(21) Appl. No.: 18/166,599

(22) Filed: Feb. 9, 2023

(65) Prior Publication Data

US 2024/0275292 A1     Aug. 15, 2024

(51) Int. Cl.

| | |
|---|---|
| *H02M 3/335* | (2006.01) |
| *B60L 50/64* | (2019.01) |
| *B60L 53/22* | (2019.01) |
| *H02J 7/00* | (2006.01) |
| *H02M 1/00* | (2007.01) |

(52) U.S. Cl.
CPC ......... *H02M 3/33573* (2021.05); *B60L 50/64* (2019.02); *B60L 53/22* (2019.02); *H02J 7/0013* (2013.01); *H02M 1/0067* (2021.05); *H02J 2207/20* (2020.01)

(58) Field of Classification Search
CPC .. H02M 3/33573; H02M 1/0067; H02M 1/10; H02M 1/008; H02M 3/33576; H02M 1/08; H02M 3/33569; B60L 50/64; B60L 53/22; B60L 58/20; B60L 1/00; H02J 7/0013; H02J 2207/20; H02J 7/0063
See application file for complete search history.

(56) References Cited

U.S. PATENT DOCUMENTS

| | | | |
|---|---|---|---|
| 6,873,134 B2 * | 3/2005 | Canter | H02J 7/0016 320/118 |
| 11,641,035 B1 * | 5/2023 | Wiegman | H01M 10/425 363/78 |
| 11,987,148 B1 * | 5/2024 | Kang | H02M 3/33584 |
| 12,097,784 B2 * | 9/2024 | Kamel | H02J 7/0063 |
| 2018/0208064 A1 * | 7/2018 | Wortberg | B60L 3/0092 |
| 2018/0262111 A1 * | 9/2018 | Taniguchi | H02M 1/14 |

(Continued)

*Primary Examiner* — Jared Fureman
*Assistant Examiner* — Michael J Warmflash
(74) *Attorney, Agent, or Firm* — CANTOR COLBURN LLP

(57) ABSTRACT

A power supply system for a vehicle is provided. The power supply system includes a high-voltage battery pack having a plurality of batteries, a primary isolated converter connected to the high-voltage battery pack, and a plurality of distributed isolated converters, each of the plurality of distributed isolated converters being connected to one of the plurality of batteries. Each of the distributed isolated converters includes a primary stage configured to receive power from one of the plurality of batteries and an isolated stage configured to provide power to a low-voltage bus. The bias signals configured to control the operation of each of the plurality of distributed isolated converters are powered by the connected one of the plurality of batteries and activated based on an enable signal provided by the primary isolated converter.

20 Claims, 9 Drawing Sheets

(56) References Cited

U.S. PATENT DOCUMENTS

| | | | | |
|---|---|---|---|---|
| 2018/0290544 A1* | 10/2018 | Long | .................... | H02J 7/0018 |
| 2020/0055405 A1* | 2/2020 | Duan | .................... | H02J 7/0014 |
| 2021/0129675 A1* | 5/2021 | Isaksson | ................ | B60L 3/12 |
| 2023/0001869 A1* | 1/2023 | Gronau | ................ | H02M 3/003 |
| 2023/0411953 A1* | 12/2023 | Chen | .................... | H03K 17/102 |
| 2024/0270118 A1* | 8/2024 | Kamel | ................ | H02J 7/0063 |
| 2024/0270120 A1* | 8/2024 | Kang | ..................... | H02J 1/082 |

\* cited by examiner

GENERATING AND SUPPLYING BIAS POWER TO ISOLATED POWER CONVERTERS

INTRODUCTION

The disclosure relates to power control systems for a vehicle, and more particularly to generating and supplying bias power to isolated power converters.

In general, vehicles include many different electrical systems. These electrical systems include, but are not limited to, infotainment systems, lighting systems, power steering systems, power braking systems, driver assistance systems, various sensors, heating and air conditioning systems, and the like. Many of these electrical systems operate on a low-voltage (i.e., 12V) bus that traditionally receives power from a low-voltage battery.

Recently, electric and hybrid vehicles have been developed which include high-voltage (i.e., >400V) battery packs and it is desirable to power the low-voltage bus with the high-voltage battery pack.

SUMMARY

In one exemplary embodiment, a power supply system for a vehicle is provided. The power supply system includes a high-voltage battery pack having a plurality of batteries, a primary isolated converter connected to the high-voltage battery pack, and a plurality of distributed isolated converters, each of the plurality of distributed isolated converters being connected to one of the plurality of batteries. Each of the distributed isolated converters includes a primary stage configured to receive power from one of the plurality of batteries and an isolated stage configured to provide power to a low-voltage bus. The bias signals configured to control the operation of each of the plurality of distributed isolated converters are powered by the connected one of the plurality of batteries and activated based on an enable signal provided by the primary isolated converter.

In addition to the one or more features described herein each of the plurality of distributed isolated converters also include an enable circuit and a regulator and the regulator is configured to create and supply the bias signals that are provided to the isolated stage and the primary stage.

In addition to the one or more features described herein the primary stage of each of the plurality of distributed isolated converters is connected to a first ground and the isolated stage of the plurality of distributed isolated converters is connected to a second ground that is separate from the first ground.

In addition to the one or more features described herein the second ground is connected to the low-voltage bus.

In addition to the one or more features described herein the first ground is connected to a ground of a connected battery module.

In addition to the one or more features described herein the power supply system includes an oring circuit that connects the isolated stage of the distributed isolated converters to the low-voltage bus.

In addition to the one or more features described herein each of the plurality of distributed isolated converters include a transformer configured to transfer power from the primary stage to the isolated stage.

In addition to the one or more features described herein the low-voltage bus is not connected to a low-voltage battery.

In one exemplary embodiment, a vehicle is provided. The vehicle includes a power supply system having a high-voltage battery pack having a plurality of batteries, a primary isolated converter connected to the high-voltage battery pack, and a plurality of distributed isolated converters, each of the plurality of distributed isolated converters being connected to one of the plurality of batteries. Each of the distributed isolated converters includes a primary stage configured to receive power from one of the plurality of batteries and an isolated stage configured to provide power to a low-voltage bus. The bias signals configured to control the operation of each of the plurality of distributed isolated converters are powered by the connected one of the plurality of batteries and activated based on an enable signal provided by the primary isolated converter.

In addition to the one or more features described herein each of the plurality of distributed isolated converters also include an enable circuit and a regulator and the regulator is configured to create and supply the bias signals that are provided to the isolated stage and the primary stage.

In addition to the one or more features described herein the primary stage of each of the plurality of distributed isolated converters is connected to a first ground and the isolated stage of the plurality of distributed isolated converters is connected to a second ground that is separate from the first ground.

In addition to the one or more features described herein the second ground is connected to the low-voltage bus.

In addition to the one or more features described herein the first ground is connected to a ground of a connected battery module.

In addition to the one or more features described herein the power supply system includes an oring circuit that connects the isolated stage of the distributed isolated converters to the low-voltage bus.

In addition to the one or more features described herein each of the plurality of distributed isolated converters include a transformer configured to transfer power from the primary stage to the isolated stage.

In addition to the one or more features described herein the low-voltage bus is not connected to a low-voltage battery.

In one exemplary embodiment, a method for generating and supplying bias power to isolated power converters for a vehicle is provided. The method includes a receiving, by a primary isolated power converter connected to a high-voltage source, an activation signal and activating, based at least in part based on the activation signal, an enable circuit of at least one isolated power converter. The method also includes creating and suppling bias signals, by a regulator of the isolated power converter that is connected to a high-voltage source, to a primary stage and to an isolated stage of the isolated power converter responsive to the activation of the enable circuit and outputting a low-voltage power by the isolated power converter.

In addition to the one or more features described herein the high-voltage source is a high-voltage battery pack that has a voltage of greater than approximately four hundred volts.

In addition to the one or more features described herein the activation signal is created based on determining that a key fob of the vehicle has moved into a threshold distance of the vehicle.

In addition to the one or more features described herein the primary stage and the isolated stage of the isolated power converter are connected to different grounds.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

As discussed above, high-voltage battery packs (i.e., >400V) have recently been added to both electric and hybrid vehicles and it is desirable to power a low-voltage bus of these vehicles with the high-voltage battery pack. In order to provide low-voltage power from a high-voltage battery pack, a voltage conditioning circuit is needed. In general, voltage conditioning circuits, such as direct current (DC)/DC converters require a bias voltage source to operate the DC/DC converters. Conventionally, these bias voltages are generated and provided by a low-voltage battery disposed within the vehicle. In vehicles configured without a low-voltage battery, these bias voltages must be generated and provided by the high-voltage battery pack.

Figure 1:
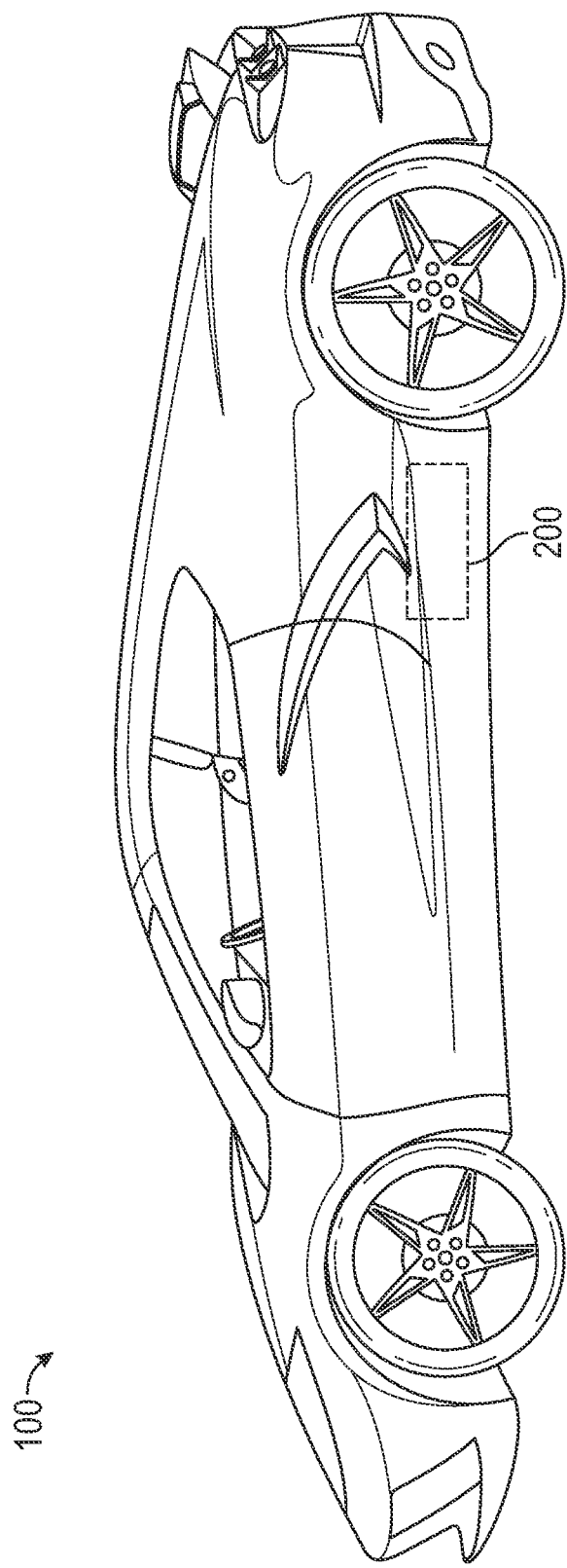
FIG. 1 is a schematic diagram of a vehicle for use in conjunction with one or more embodiments of the present disclosure.

Referring now to FIG. 1, a schematic diagram of a vehicle 100 for use in conjunction with one or more embodiments of the present disclosure is shown. The vehicle 100 includes a power supply system 200. In one embodiment, the vehicle 100 is a hybrid vehicle that utilizes both an internal combustion engine and an electric motor drive system. In another embodiment, the vehicle 100 is one of an electric vehicle propelled only by an electric motor or multiple electric motors. In another embodiment, the vehicle 100 is of conventional type and propelled by an internal combustion engine.

Electric vehicles (EVs) such as battery electric vehicles (BEVs), hybrid vehicles, and/or fuel cell vehicles include one or more electric machines and a high-voltage battery pack. A power control system is used to control the charging and/or discharging of the high-voltage battery system. The power control system includes an accessory power module (APM) that is configured to provide low-voltage power to one or more electrical systems of the vehicle. As used herein the term low-voltage generally refers to voltages less than fifty volts and high-voltage generally refers to voltages greater than one hundred volts.

Figure 2A:
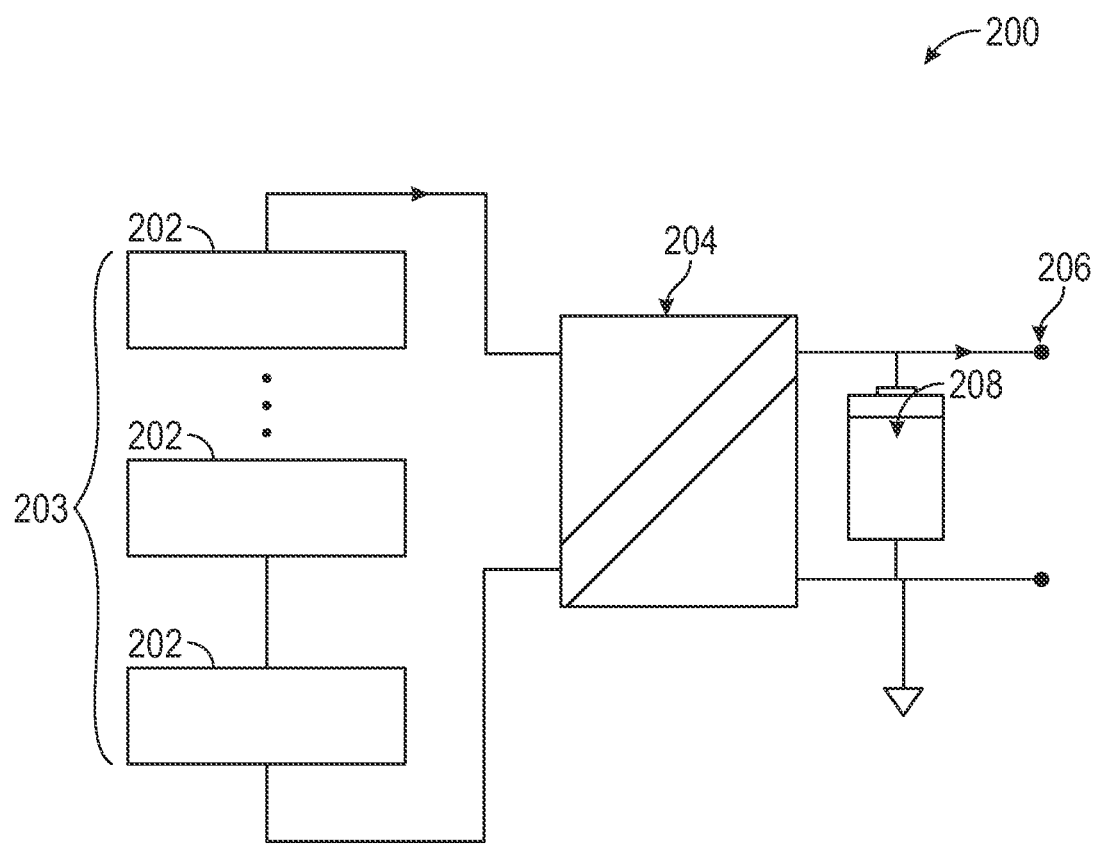
FIG. 2A is a block diagram illustrating a portion of a power supply system for a vehicle in accordance with an exemplary embodiment.

Referring now to FIG. 2A, a block diagram illustrating a portion of power supply system 200 for a vehicle in accordance with an exemplary embodiment is shown. The power supply system 200 includes a plurality of batteries 202 that are connected in series to form a high-voltage battery pack 203. The high-voltage battery pack is connected to a DC/DC converter 204 that is configured to provide power to a low-voltage bus 206. In exemplary embodiments, the power supply system 200 may also include a low-voltage battery 208 that is also connected to the low-voltage bus 206.

Figure 2C:
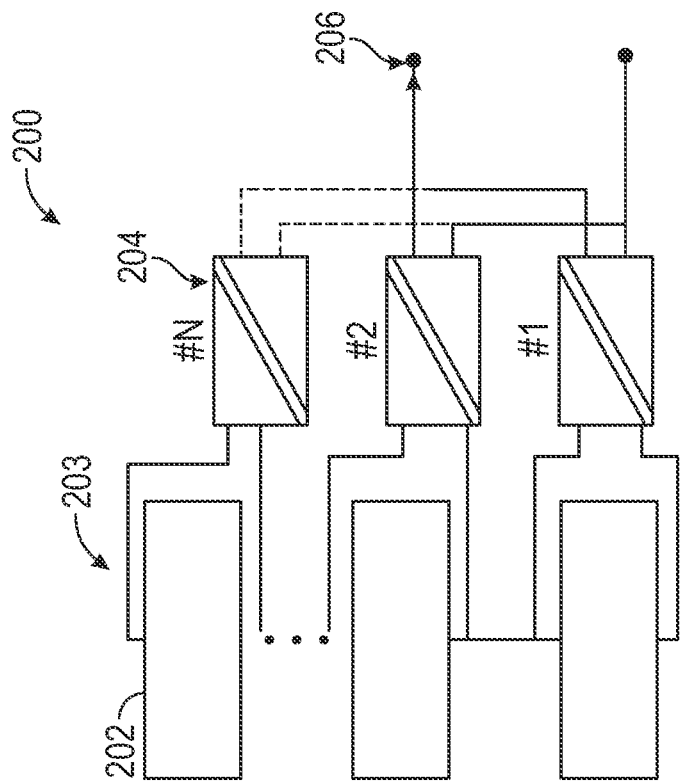
FIG. 2C is a block diagram illustrating a portion of a power supply system for a vehicle in accordance with a further exemplary embodiment.
Figure 2B:
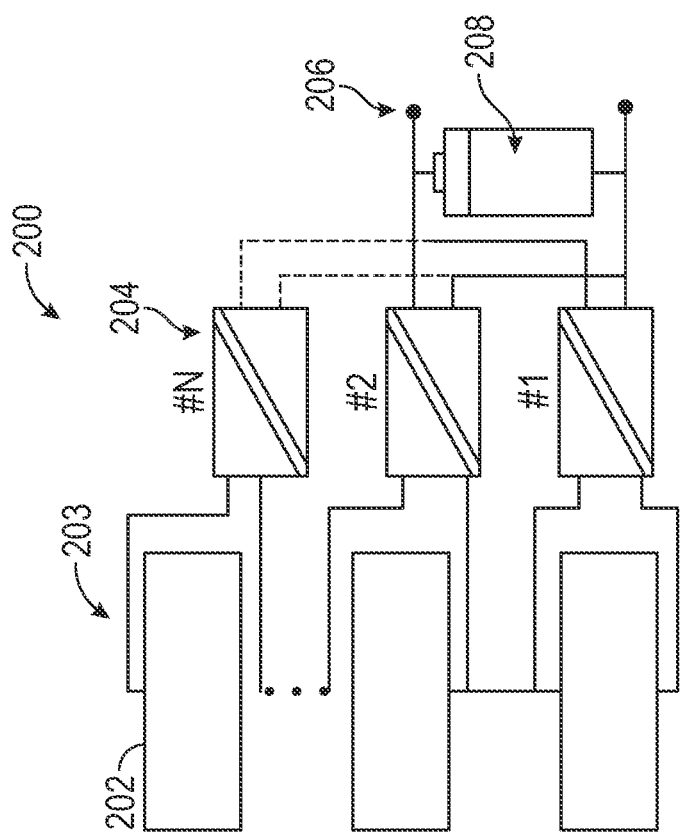
FIG. 2B is a block diagram illustrating a portion of a power supply system for a vehicle in accordance with another exemplary embodiment.

Referring now to FIG. 2B, a block diagram illustrating a portion of a power supply system 200 for a vehicle in accordance with another exemplary embodiment is shown. The power supply system 200 includes a plurality of batteries 202 that are connected in series to form a high-voltage battery pack 203. Each of plurality of batteries 202 are connected to a DC/DC converter 204 that is configured to provide power to a low-voltage bus 206. In exemplary embodiments, the power supply system 200 also includes a low-voltage battery 208 that is also connected to the low-voltage bus 206. In exemplary embodiments, each of the DC/DC converters 204 are connected to one another in parallel.

Referring now to FIG. 2C, a block diagram illustrating a portion of a power supply system 200 for a vehicle in accordance with a further exemplary embodiment is shown. The power supply system 200 includes a plurality of batteries 202 that are connected in series to form a high-voltage battery pack 203. Each plurality of batteries 202 is connected to a DC/DC converter 204 that is configured to provide power to a low-voltage bus 206. In this embodiment, the power supply system 200 does not include a low-voltage battery. In exemplary embodiments, each of the DC/DC converters 204 are connected to one another in parallel.

Figure 3:
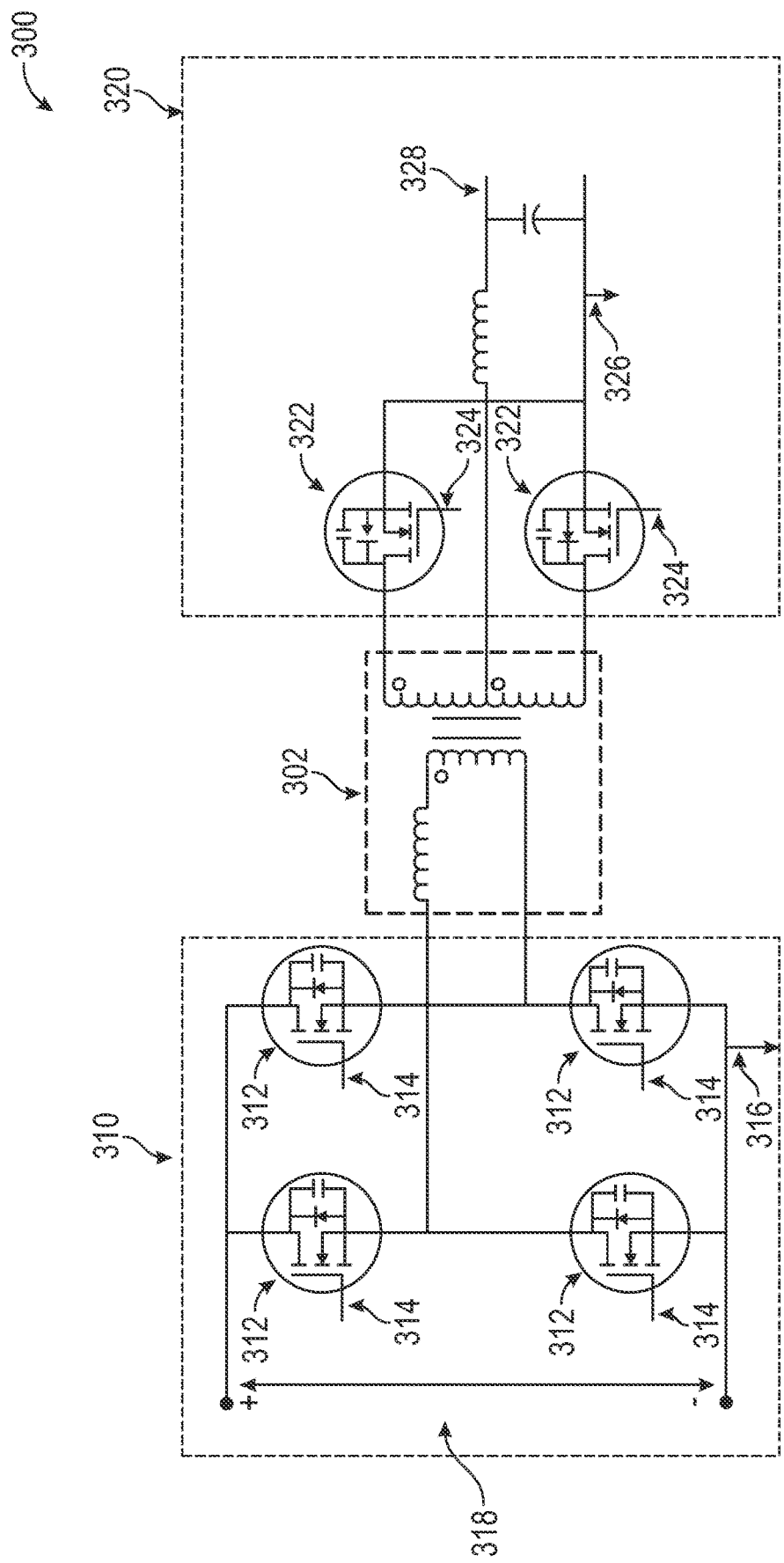
FIG. 3 is a schematic illustrating an isolated power converter in accordance with an exemplary embodiment.

In exemplary embodiments, the DC/DC converters of the power supply system 200 are isolated converters, (i.e., there is no direct conduction path between two parts of the circuit). The isolation will always present a barrier between the input stage and the output stage and is provided for safety. Isolation can be created by incorporating a transformer in the circuit so that power is transferred using electromagnetic energy. FIG. 3 is a schematic illustrating an isolated power converter 300 in accordance with an exemplary embodiment. The isolated power converter 300 is configured to receive an input voltage 318, which may be a high-voltage in excess of approximately 400 Volts and to provide an output voltage 328, which may be a low-voltage of 48 Volts or less.

The isolated power converter 300 includes an input stage 310, also referred to as a primary stage, and an output stage 320, also referred to as an isolated stage. The input stage 310 includes a primary ground 316 that is separate from an isolated ground 326 of the output stage 320. The isolated power converter 300 includes a transformer 302 configured to transfer power from the primary stage 310 to the isolated stage 320. As illustrated, the primary stage 310 includes a plurality of switches 312 that are controlled by applying bias signal 314 to the gate of the switch 312. Likewise, the isolated stage 320 includes a plurality of switches 322 that are controlled by applying bias signal 324 to the gate of the switches 322. In exemplary embodiments, the bias signals 314, 324 are used to control the output voltage 328 of the isolated power converter 300.

In one embodiment, the power for the bias signals 314, 324 may be provided by a low-voltage battery disposed within the vehicle. In another embodiment, where the vehicle does not include a low-voltage battery, the power for the bias signals 314, 324 is provided by one or more batteries of the high-voltage battery pack of the vehicle.

Figure 4:
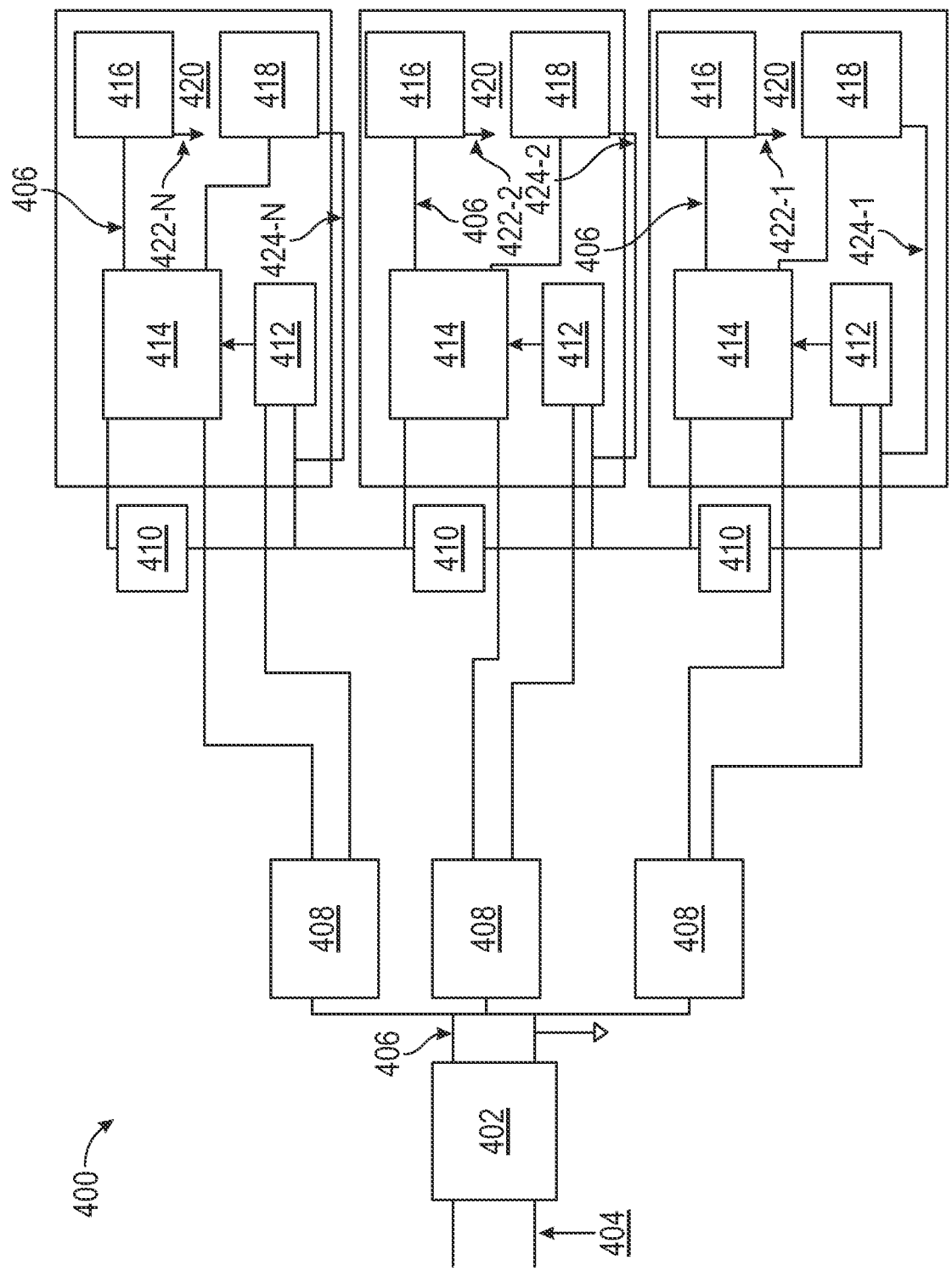
FIG. 4 is a schematic illustrating a portion of a power supply system in accordance with an exemplary embodiment.

Referring now to FIG. 4 a schematic illustrating a portion of power supply system 400 in accordance with an exemplary embodiment is shown. The power supply system 400 includes a first isolated converter 402 that is connected to a high-voltage source, such as a high-voltage battery pack. The first isolated converter 402 receives a primary enable signal 404 that is configured to activate the first isolated converter 402. In exemplary embodiments, the primary enable signal 404 is an ultra-low power signal that is received from a vehicle controller in response to the vehicle detecting a presence of a key fob or based on another suitable event.

The first isolated converter 402 is configured to create and propagate bias signals 406 to one or more isolators 408 that in turn propagate enable signals to a plurality of enable circuits 412. The power supply system 400 also includes a plurality of batteries 410 that are each connected to a regulator 414 that is activated by the enable circuits 412. Each regulator 414 is configured to create and supply bias signals 406 that are provided to the isolated stage 416 and the primary stage 418 of an isolated power converter 420. As illustrated, the isolated stages 416 are connected to isolated ground 422-1, 422-2, 422-N that are separate from module grounds 424-1, 424-2, 424-N that are connected to the primary stage 418. In one embodiment, one or more of the isolated grounds 422-1, 422-2, 422-N can be connected to one another.

Figure 5:
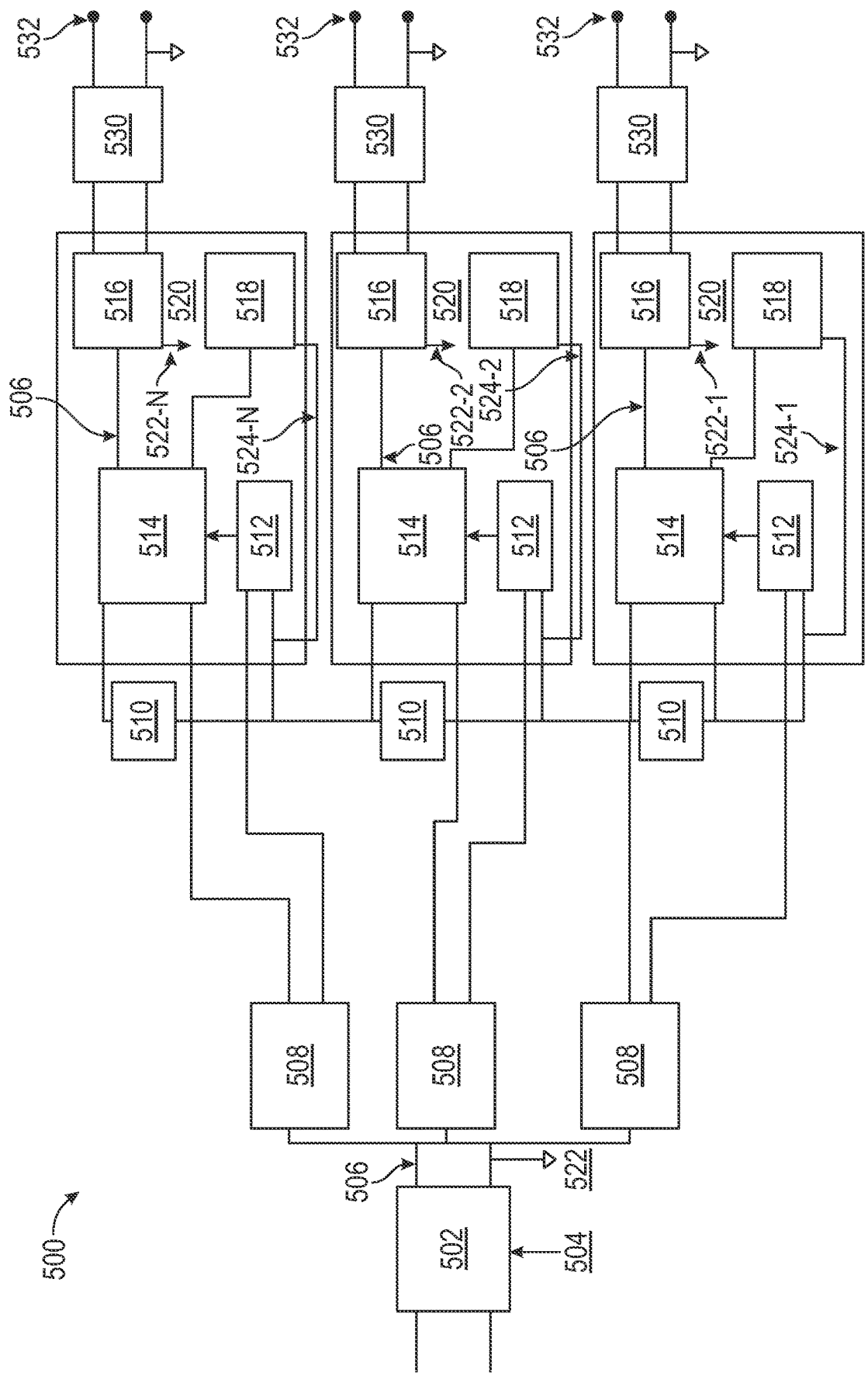
FIG. 5 is a schematic illustrating a portion of a power supply system in accordance with an exemplary embodiment.

Referring now to FIG. 5, a schematic illustrating a portion of power supply system 500 in accordance with an exemplary embodiment is shown. The power supply system 500 includes a first isolated converter 502 that is connected to a high-voltage source, such as a high-voltage battery pack. The first isolated converter 502 receives a primary enable signal 504 that is configured to activate the first isolated converter 502. In exemplary embodiments, the primary enable signal 504 is an ultra-low power signal that is received from a vehicle controller in response to the vehicle detecting a presence of a key fob or based on another suitable event.

The first isolated converter 502 is configured to create and propagate bias signals 506 to one or more isolators 508 that in turn propagate enable signals to a plurality of enable circuits 512. The power supply system 500 also includes a plurality of batteries 510 that are each connected to a regulator 514 that is activated by the enable circuits 512. Each regulator 514 is configured to create and supply bias signals 506 that are provided to the isolated stage 516 and the primary stage 518 of an isolated power converter 520. As illustrated, the isolated stages 516 are connected to isolated grounds 522-1, 522-2, 522-N that are separate from module grounds 524-1, 524-2, 524-N that are connected to the primary stage 518. In one embodiment, one or more of the isolated grounds 522, 522-1, 522-2, 522-N can be connected to one another.

In exemplary embodiments, the output of the isolated stage 516 of each the isolated power converter 520 is connected to a low-voltage bus 532 via an oring circuit 530 (i.e., circuit that provides redundant power paths). In exemplary embodiments, the oring circuit 530 protects the low-voltage bus 532 by blocking shorted-output power conversion units and isolating their discharged output capacitors when a unit is connected during system operation.

Figure 6:
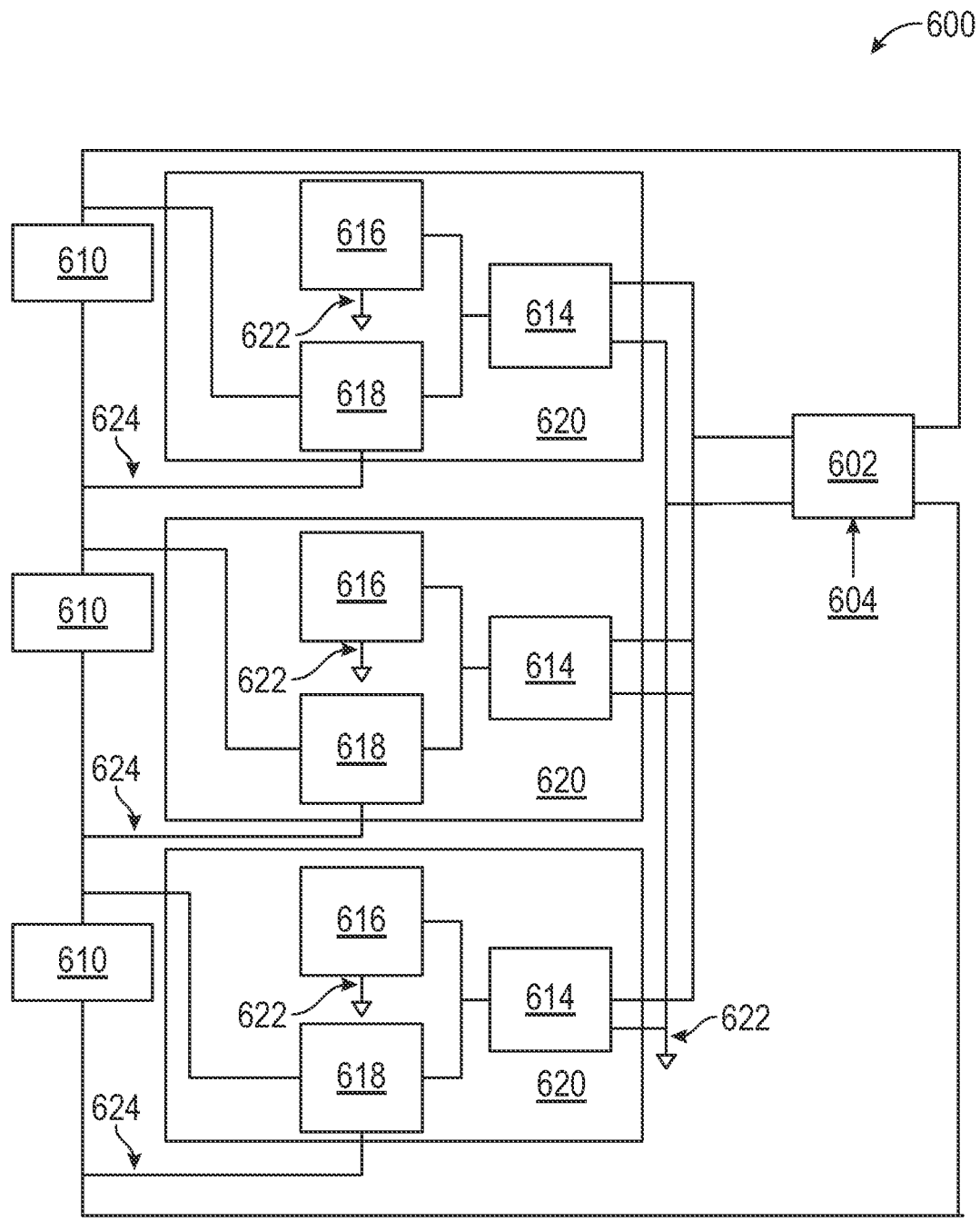
FIG. 6 is a schematic illustrating a portion of a power supply system in accordance with an exemplary embodiment.

Referring now to FIG. 6, a schematic illustrating a portion of power supply system 600 in accordance with an exemplary embodiment is shown. The power supply system 600 includes a first isolated converter 602 that is connected to a high-voltage source, such as a high-voltage battery pack. The first isolated converter 602 receives a primary enable signal 604 that is configured to activate the first isolated converter 602. In exemplary embodiments, the primary enable signal 604 is an ultra-low power signal that is received from a vehicle controller in response to the vehicle detecting a presence of a key fob or based on another suitable event.

The first isolated converter 602 is configured to create and propagate a low-voltage signal to multiple distributed isolated power converters 620, which are each associated with a high-voltage battery module 610. Each distributed isolated power converter 620 includes a regulator 614, a primary stage 618 and an isolated stage 616. As illustrated, the isolated stage 616 is connected to an isolated ground 622 that is separate from a module ground 624 that is connected to the primary stage 618. The regulator 614 is configured to create bias signals that are provided to the isolated stage 616 and the primary stage 618 of the distributed isolated power converters 620.

Figure 7A:
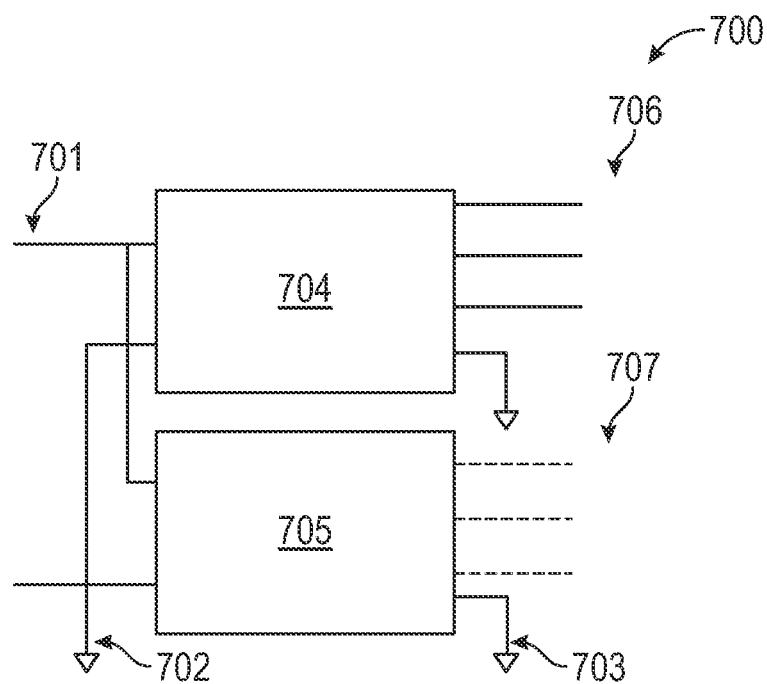
FIGS. 7A, 7B, and 7C are block diagrams illustrating various converter configurations for a power supply system in accordance with exemplary embodiments.
Figure 7B:
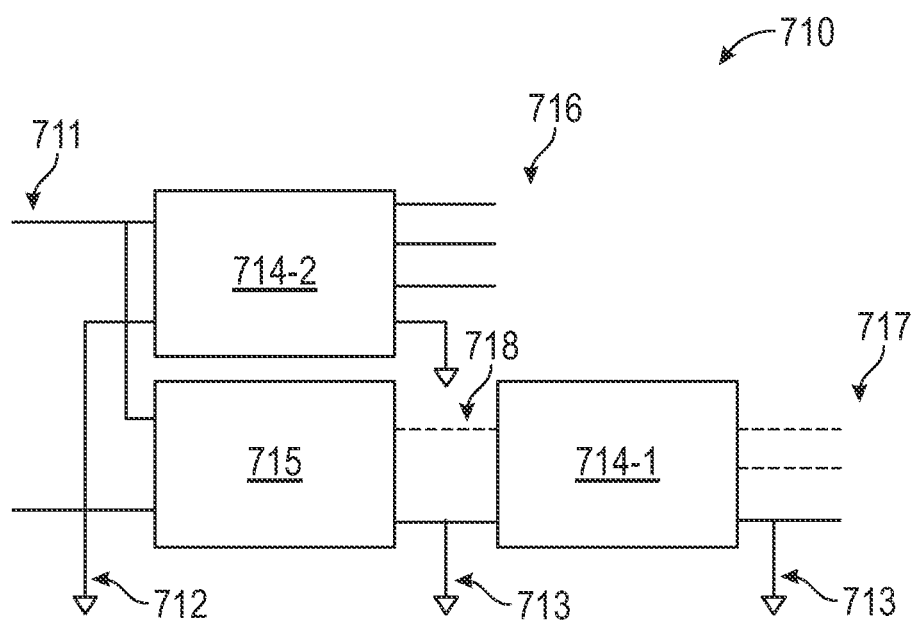
Figure 7C:
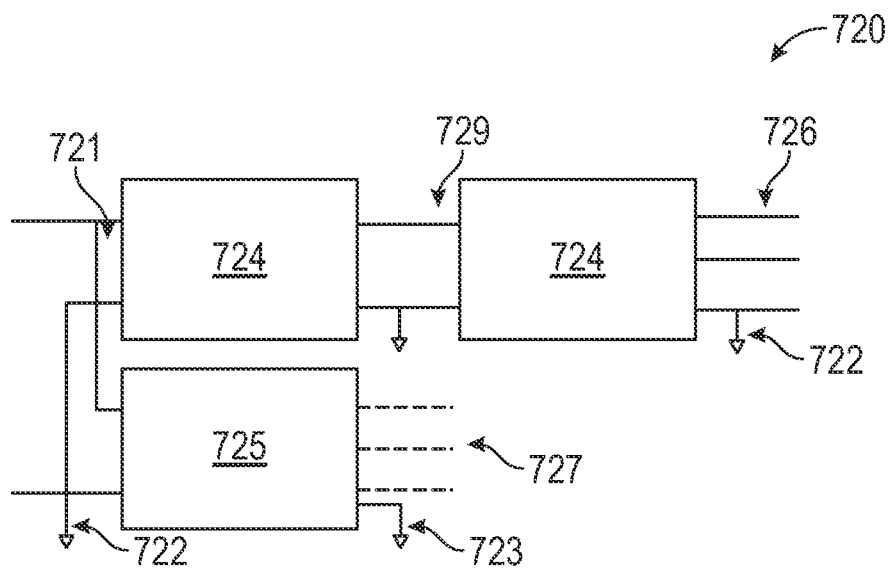

In exemplary embodiments, the power supply systems that are shown in FIGS. 4, 5, and 6 may further include one or more converter configurations that are configured to receive and output multiple different voltages. Referring now to FIGS. 7A, 7B, and 7C, a block diagram illustrating various converter configurations for a power supply system in accordance with exemplary embodiments are shown.

FIG. 7A illustrates a first converter configuration 700 that includes an isolated converter 705 and a non-isolated converter 704. The isolated converter 705 includes a primary stage that is connected to a module ground 703 and an isolated stage that is connected to a common ground 702, that is separate from the module ground 703. The isolated converters 705 receives the intermediate voltage 701 and creates various input voltages 707. The non-isolated converter 704 receives the intermediate voltage 701 and creates various output voltages 706.

FIG. 7B illustrates a second converter configuration 710 that includes an isolated converter 715 and two non-isolated converter 714-1, 714-2. The isolated converter 715 includes a primary stage that is connected to a module ground 713 and an isolated stage that is connected to a common ground 712, which is separate from the module ground 713. The isolated converter 715 receives the intermediate voltage 718 and creates a second intermediate voltage 711, which is a low-voltage. Non-isolated converter 714-1 receives the intermediate voltage 718 and creates various output voltages 717. Non-isolated converter 714-2 receives the second intermediate voltage 711 and creates various output voltages 716.

FIG. 7C illustrates a third converter configuration 720 that includes an isolated converter 725 and two non-isolated converters 724. The isolated converter 725 includes a primary stage that is connected to a module ground 723 and an isolated stage that is connected to a common ground 722, which is separate from the module ground 723. The isolated converter 725 receives an intermediate voltage 721 and creates various output voltages 727. One of the non-isolated converters 724 receives the intermediate voltage 721 and creates a second intermediate voltage 729. The second non-isolated converter 724 receives the second intermediate voltage 729 and creates various output voltages 726.

Figure 8:
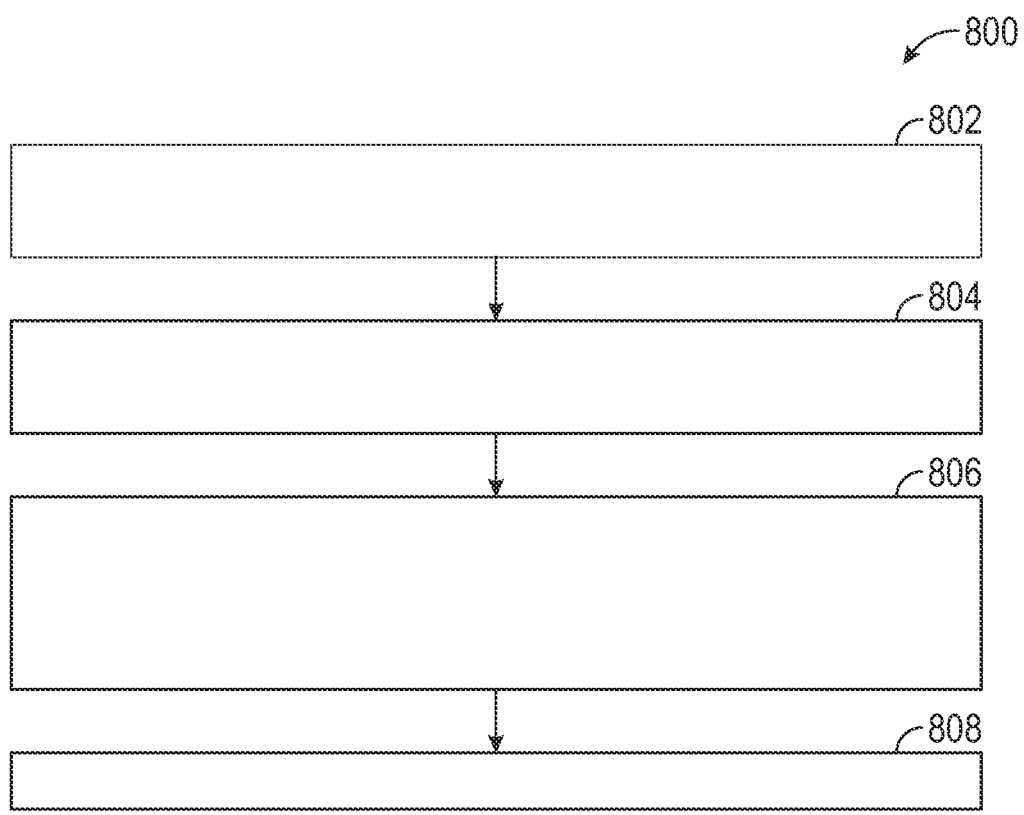
FIG. 8 is a flowchart illustrating a method for generating and supplying bias power to isolated power converters in accordance with an exemplary embodiment.

Referring now to FIG. 8, a flowchart illustrating a method 800 for generating and supplying bias power to isolated power converters for a vehicle in accordance with an exemplary embodiment is shown. At block 802, the method 800 includes receiving, by a primary isolated converter connected to a high-voltage source, an activation signal. In exemplary embodiments, the high-voltage source is a high-voltage battery pack that has a voltage of greater than approximately four hundred volts. In exemplary embodiments, the activation signal is created based on determining that a key fob of the vehicle has moved into a threshold distance of the vehicle. Next, as block 804, the method 800 includes activating, based at least in part based on the activation signal, an enable circuit of at least one isolated converter. In exemplary embodiments, the at least isolated converter is connected to the high-voltage battery pack. In exemplary embodiments, distributed converters are connected across plurality of batteries in high-voltage battery pack. In exemplary embodiments, the enable circuit of a distributed isolated converter is activated based on an output of the primary isolated converter in response to the activation signal. At block 806, the method 800 includes creating and suppling bias signals, by a regulator of the distributed isolated converter that is connected to a high-voltage source, to a primary stage and to an isolated stage of the distributed isolated converter responsive to the activation of the enable circuit. In exemplary embodiments, the primary stage and the isolated stage of the distributed isolated converter are connected to different grounds. At block 808, the method 800 includes outputting a low-voltage power by the distributed isolated converter.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A power supply system for a vehicle, the power supply system comprising:
    a high-voltage battery pack having a plurality of batteries;
    a primary isolated converter connected to the high-voltage battery pack; and
    a plurality of distributed isolated converters, each of the plurality of distributed isolated converters being connected to one of the plurality of batteries,
    wherein each of the distributed isolated converters includes a primary stage configured to receive power from one of the plurality of batteries and an isolated stage configured to provide power to a low-voltage bus, and
    wherein bias signals configured to control operation of each of the plurality of distributed isolated converters are powered by the connected one of the plurality of batteries and activated based on an enable signal provided by the primary isolated converter.

2. The power supply system of claim 1, wherein each of the plurality of distributed isolated converters also include an enable circuit and a regulator and the regulator is configured to create and supply the bias signals that are provided to the isolated stage and the primary stage.

3. The power supply system of claim 1, wherein the primary stage of each of the plurality of distributed isolated converters is connected to a first ground and the isolated stage of the plurality of distributed isolated converters is connected to a second ground that is separate from the first ground.

4. The power supply system of claim 3, wherein the second ground is connected to the low-voltage bus.

5. The power supply system of claim 3, wherein the first ground is connected to a ground of a connected battery module.

6. The power supply system of claim 1, further comprising an oring circuit that connects the isolated stage of the distributed isolated converters to the low-voltage bus.

7. The power supply system of claim 1, wherein each of the plurality of distributed isolated converters include a transformer configured to transfer power from the primary stage to the isolated stage.

8. The power supply system of claim 1, wherein the low-voltage bus is not connected to a low-voltage battery.

9. A vehicle comprising:
    a power supply system comprising:
        a high-voltage battery pack having a plurality of batteries;
        a primary isolated converter connected to the high-voltage battery pack; and
        a plurality of distributed isolated converters, each of the plurality of distributed isolated converters being connected to one of the plurality of batteries,
        wherein each of the distributed isolated converters includes a primary stage configured to receive power from one of the plurality of batteries and an isolated stage configured to provide power to a low-voltage bus, and wherein bias signals configured to control the operation of each of the plurality of distributed isolated converters are powered by the connected one of the plurality of batteries and activated based on an enable signal provided by the primary isolated converter.

10. The vehicle of claim 9, wherein each of the plurality of distributed isolated converters also include an enable circuit and a regulator and the regulator is configured to create and supply the bias signals that are provided to the isolated stage and the primary stage.

11. The vehicle of claim 9, wherein the primary stage of each of the plurality of distributed isolated converters is connected to a first ground and the isolated stage of the plurality of distributed isolated converters is connected to a second ground that is separate from the first ground.

12. The vehicle of claim 11, wherein the second ground is connected to the low-voltage bus.

13. The vehicle of claim 11, wherein the first ground is connected to a ground of a connected battery module.

14. The vehicle of claim 9, further comprising an oring circuit that connects the isolated stage of the distributed isolated converters to the low-voltage bus.

15. The vehicle of claim 9, wherein each of the plurality of distributed isolated converters include a transformer configured to transfer power from the primary stage to the isolated stage.

16. The vehicle of claim 9, wherein the low-voltage bus is not connected to a low-voltage battery.

17. A method for generating and supplying bias power to isolated power converters for a vehicle, the method comprising:

receiving, by a primary isolated power converter connected to a high-voltage source, an activation signal;

activating, based at least in part based on the activation signal, an enable circuit of at least one isolated power converter;

creating and supplying bias signals, by a regulator of the isolated power converter that is connected to a high-voltage source, to a primary stage and to an isolated stage of the isolated power converter responsive to the activation of the enable circuit; and outputting a low-voltage power by the isolated power converter.

18. The method of claim 17, wherein the high-voltage source is a high-voltage battery pack that has a voltage of greater than approximately four hundred volts.

19. The method of claim 17, wherein the activation signal is created based on determining that a key fob of the vehicle has moved into a threshold distance of the vehicle.

20. The method of claim 17, wherein the primary stage and the isolated stage of the isolated power converter are connected to different grounds.

* * * * *